United States Patent
Yang et al.

(10) Patent No.: US 11,941,047 B2
(45) Date of Patent: Mar. 26, 2024

(54) MUSIC PLAYING METHOD AND DEVICE

(71) Applicant: BEIJING ZITIAO NETWORK TECHNOLOGY CO., LTD., Beijing (CN)

(72) Inventors: Yuhao Yang, Beijing (CN); Peng Chen, Beijing (CN); Hai Ning, Beijing (CN); Lei Sun, Beijing (CN); Niwen Zheng, Beijing (CN); Yanjingjing Gao, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 30 days.

(21) Appl. No.: 17/601,864

(22) PCT Filed: Jul. 2, 2021

(86) PCT No.: PCT/CN2021/104372
§ 371 (c)(1),
(2) Date: Oct. 6, 2021

(87) PCT Pub. No.: WO2022/179033
PCT Pub. Date: Sep. 1, 2022

(65) Prior Publication Data
US 2023/0099935 A1 Mar. 30, 2023

(30) Foreign Application Priority Data

Feb. 23, 2021 (CN) .......................... 202110204883.8
Mar. 1, 2021 (CN) ......................... 202110227192.X

(51) Int. Cl.
*G06F 16/683* (2019.01)
*G06F 16/638* (2019.01)
(Continued)

(52) U.S. Cl.
CPC .......... *G06F 16/683* (2019.01); *G06F 16/638* (2019.01); *G06F 16/65* (2019.01); *G06F 3/0488* (2013.01)

(58) Field of Classification Search
CPC . G06F 1/683; G06F 1/638; G06F 1/65; G06F 3/0488
See application file for complete search history.

(56) References Cited

U.S. PATENT DOCUMENTS 10,296,638 B1 * 5/2019 Chen ....................... G06F 16/68
11,210,339 B1 * 12/2021 Paul ...................... G06F 16/639
2012/0159535 A1 6/2012 Gratton et al.

FOREIGN PATENT DOCUMENTS

CN 105872811 A 8/2016
CN 106873869 A 6/2017
(Continued)

OTHER PUBLICATIONS

QQ Music Application, Version No. 10.0.0.12, Tencent Music, Mar. 3, 2020, available at https://www.wandoujia.com/search?key=qq%E9%9F%B3%E%B%9010.0&source=index (3 pages).
(Continued)

*Primary Examiner* — Kenneth B Lee, Jr.

(57) ABSTRACT

Embodiments of the present disclosure provide a music playing method and device, where the method includes: receiving a first operation instruction in a first application with a function of video playing; and invoking a music player to play music in the first application in response to the first operation instruction. According to the embodiments of the present disclosure, music can be played in a first application through a first operation instruction of a user, avoiding that the user exits from the first application and then enters the music application to play music, and reducing an operation complexity of the user.

18 Claims, 4 Drawing Sheets

(51) Int. Cl.
*G06F 16/65* (2019.01)
*G06F 3/0488* (2022.01)

(56) References Cited

FOREIGN PATENT DOCUMENTS

| | | |
|---|---|---|
| CN | 109302538 A | 2/2019 |
| CN | 305427121 S | 7/2019 |
| CN | 110335625 A | 10/2019 |
| CN | 112269898 A | 1/2021 |
| CN | 112394900 A | 2/2021 |
| CN | 112965686 A | 6/2021 |
| WO | 2020125334 A1 | 6/2020 |

OTHER PUBLICATIONS

First Office Action dated Oct. 26, 2022 in Chinese Patent Application No. 202110227192.X, with English translation (21 pages).
Written Opinion and International Search Report dated Nov. 23, 2022 in International Application No. PCT/CN2021/104372 (9 pages) with English translation (2 pages).

* cited by examiner

MUSIC PLAYING METHOD AND DEVICE

CROSS-REFERENCE TO RELATED APPLICATIONS

This application is a National Stage of International Application No. PCT/CN2021/104372, filed Jul. 2, 2021, which claims priority to Chinese Patent Application No. 202110227192.X, filed on Mar. 1, 2021 Chinese Patent Application No. 202110204883.8, filed on Feb. 23, 2021. Both of the above applications are hereby incorporated by reference in their entireties.

TECHNICAL FIELD

Embodiments of the present disclosure relate to technical field of terminal device, and in particular, to a music playing method and device.

BACKGROUND

With functions of a terminal device becoming more and more powerful, a use of the terminal device by people is becoming increasingly widespread. The use of the terminal device by people is mostly a use of application program running in the terminal device. Functions provided by different application programs are different. For example, a video application can provide a user with various functions of video searching and playing, and a music application can provide a user with functions of music searching and playing.

In a process of using a terminal device by a user, how to reduce an operation complexity of the user is a problem demanding prompt solution.

SUMMARY

Embodiments of the present disclosure provide a music playing method and device to reduce an operation complexity in the process of using a terminal device by a user.

In a first aspect, embodiments of the present disclosure provide a music playing method, including:

receiving a first operation instruction in a first application with a function of video playing;

invoking a music player to play music in the first application in response to the first operation instruction, where the music is audio music or video music.

In a second aspect, embodiments of the present disclosure provide a terminal device, including:

an operation instruction receiving module, configured to receive a first operation instruction in a first application with a function of video playing;

a music playing module, configured to invoke a music player to play music in the first application in response to the first operation instruction, where the music includes at least one of the following: audio music and video music.

In a third aspect, embodiments of the present disclosure provide a terminal device, including: at least one processor and a memory;

the memory stores computer executable instructions;

the at least one processor executes the computer executable instructions stored by the memory, causing the terminal device to implement the method in the above first aspect.

In a fourth aspect, embodiments of the present disclosure provide a computer readable storage medium, the computer readable storage medium has computer executable instructions stored therein, and when the computer executable instructions are executed by a processor, causing a computing device to implement the method in the above first aspect.

In a fifth aspect, embodiments of the present disclosure provide a computer program, where the computer program is used for implementing the method in the above first aspect.

In a six aspect, embodiments of the present disclosure provide a computer program product, including computer program instructions, where the computer program instructions causes a computer to implement the method in the above first aspect.

A music playing method and device provided by embodiments of the present disclosure, where the method includes: receiving a first operation instruction in a first application with a function of video playing; and invoking a music player to play music in the first application in response to the first operation instruction. According to the embodiments of the present disclosure, music can be played in a first application through a first operation instruction by a user, avoiding that the user exits from the first application and then enters a music application to play music, and reducing the operation complexity of the user.

BRIEF DESCRIPTION OF THE DRAWINGS

In order to illustrate a technical solution of an embodiment of the present disclosure or prior art more clearly, accompanying drawings required by descriptions of the embodiments or the prior art will now be briefly introduced. Apparently, accompanying drawings in the following description are some embodiments of the present disclosure, and for one of ordinary skill in the art, other accompanying drawings can be obtained according to these accompanying drawings under a precondition of paying no creative labor.

DESCRIPTION OF EMBODIMENTS

In order to make purposes, technical solutions and advantages of embodiments of the present disclosure more clear, technical solutions in embodiments of the present disclosure will be described clearly and completely in connection with accompanying drawings in embodiments of the present disclosure, and obviously, embodiments described are part of embodiments of the present disclosure rather than all embodiments. Based on embodiments in the present disclosure, all other embodiments obtained by one of ordinary skill in the art under a precondition of paying no creative labor are within the scope that the present disclosure protects.

Embodiments of the present disclosure can be applied to a terminal device. A user can play video data and audio data in a process of using the terminal device.

In prior art, a user can search a video and play the video in a video application running in a terminal device in a process of using the terminal device. In a process of running a video application by the terminal device, if the user needs to switch to a music application, the user needs to firstly exit the video application, then look up the music application in the terminal device, and finally start the music application to search music and play music in the music application.

As can be seen, in the above process of switching from the video application to the music application, operation steps which the user needs to perform are more, resulting in higher operation complexity of the user.

In order to solve the above problem, music can be directly played in a video application, avoiding that a user switches from a video application to a music application. Thus, the user does not need to exit the video application, look up the music application, and start the music application, reducing operation steps of the user, and further reducing an operation complexity of the user.

Figure 1:
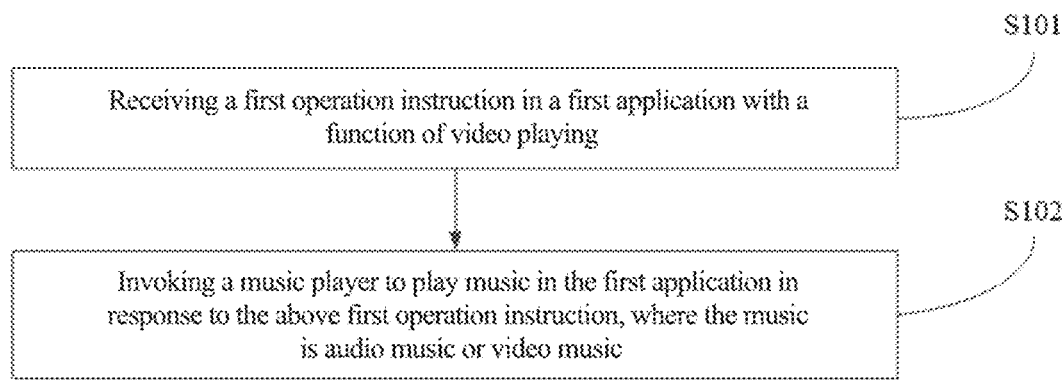
FIG. 1 exemplarily gives a flowchart of steps of a music playing method provided by an embodiment of the present disclosure.

Referring to FIG. 1, FIG. 1 exemplarily gives a flowchart of steps of a music playing method provided by an embodiment of the present disclosure. The method shown in FIG. 1 can be applied in a terminal device, the steps of which are performed by the terminal device, including:

S101: receiving a first operation instruction in a first application with a function of video playing.

Where the first application is an application program that provides functions of video searching, video playing, etc., and can also be referred to as a video application. In an embodiment of the present disclosure, the first application can be a short video application, the short video application is an application program for providing functions of short video searching, short video playing, etc., and the short video is a video with duration less than or equal to preset duration. For example, the preset duration can be 5 minutes such that the short video can be a video with duration less than or equal to 5 minutes.

The above first operation instruction can be an operation instruction for a first control in the first application interface, or can be a sliding instruction in the first application interface, etc. Any interface in the first application is referred to as the above first application interface, and the first application interface can include, but is not limited to: a first interface of the first application, an interface of playing video data in the first application, and an interface of displaying a searching result in the first application.

S102: invoking a music player to play music in the first application in response to the above first operation instruction, where the music is audio music or video music.

Where the music player is a player built-in in the first application, and when invoking the music player to play music, there is no need to skip to a remaining application, and directly skipping to an audio-video playing interface of the first application to play music.

The above audio music is music expressed in an audio format, the video music is music expressed by audio and video, the video music plays audio and video at the same time when playing, and the video music can be MTV (music television, also referred to as MTV).

In the above first application, a function of video playing is realized through the first player, and the first player and the music player have different interfaces. Displaying modes of different interfaces and layouts of controls used for controlling the playing in the interface are different.

Figure 2:
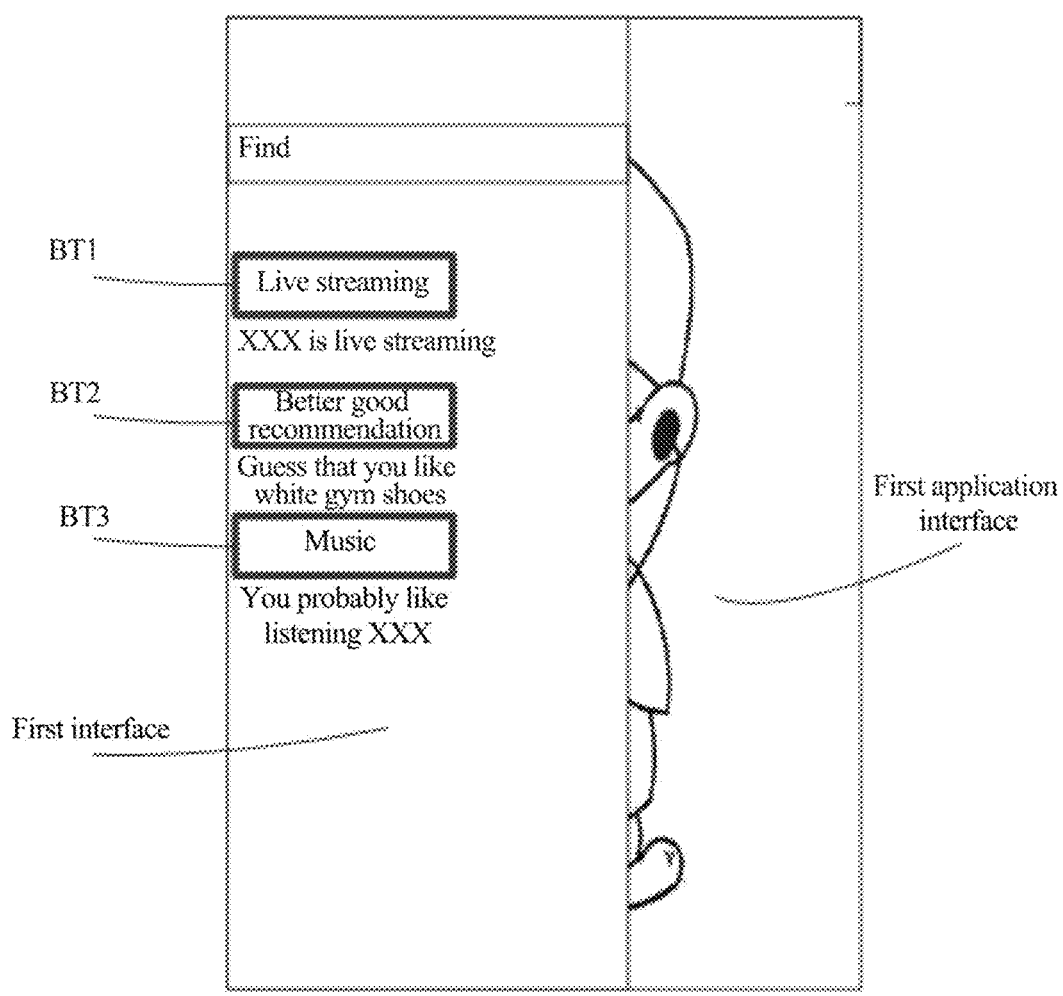
FIG. 2 and FIG. 3 exemplarily illustrate schematic diagrams of two first interfaces provided by an embodiment of the present disclosure.

One typical application scenario of an embodiment of the present disclosure is that, a user plays a video in a first player of a first application, where the video includes music, and the user is interested in the music, so as to invoke a music player to play music in the first application. That is, music played in the music player is associated with music included in the video being played in the first player. In an implementation, invoking the music player to play music in the first application, including:

firstly, displaying a first interface, where the first interface includes at least one control, and each of the control corresponds to a type of service; then, receiving a second operation instruction for a second control in the at least one control by a user; and finally, invoking the music player to play music in the first application in response to the second operation instruction.

Where the above first interface is used for displaying a plurality of controls, and one control corresponds to a kind of service, i.e. a type of service. For example, as shown in FIG. 2, a first interface overlies on a first application interface, the first interface can be displayed with three controls: BT1, BT2, and BT3, BT1 corresponds to a "live streaming" service, BT2 corresponds to a "better good recommendation" service, and BT3 corresponds to a "music" service. Thereby, after the user clicks on the BT1 to skip to the live streaming interface, one or more live streaming information is displayed, after the user clicks on the BT2 to skip to the better good recommendation interface, one or more recommended commodities are displayed, and after the user clicks on the BT3 to skip to the music interface, the one or more music are displayed. The music interface herein is namely a subsequent second interface.

It can be appreciated that the control BT3 corresponding to the above "music" service is a second control. The first interface can overlay on the first application interface and can completely or partially cover the first application interface. The first interface can be located at any location on the first application interface.

Each of the above control can correspond to a main title and a subtitle, the main title is used for simply illustrating a function of the control, and the subtitle is used for illustrating the function of the control in more detail. In an embodiment of the present disclosure, the main title is fixed. As shown in FIG. 2, the main title of BT1 is "live streaming", the main title of BT2 is "better good recommendation", and the main title of BT3 is "music". The subtitle can be one for displaying randomly selected from the preset title library for different users at different times. For example, for BT3, the following six subtitles are included in the preset title library: "find hot song" "exclusive designated good song today", "good song recommended for you", "good song recommended according to your taste", "good song customization", "hot song radar", and in FIG. 2 "you can love to listen to XXX" is randomly selected as a subtitle. For all users, at any time, the main titles of the BT3 are all "music", but the subtitle is one randomly selected from the preset title library for the user at the time, i.e., the subtitle can be different for different users, and the subtitle can also be different for the same user at different times.

Figure 3:
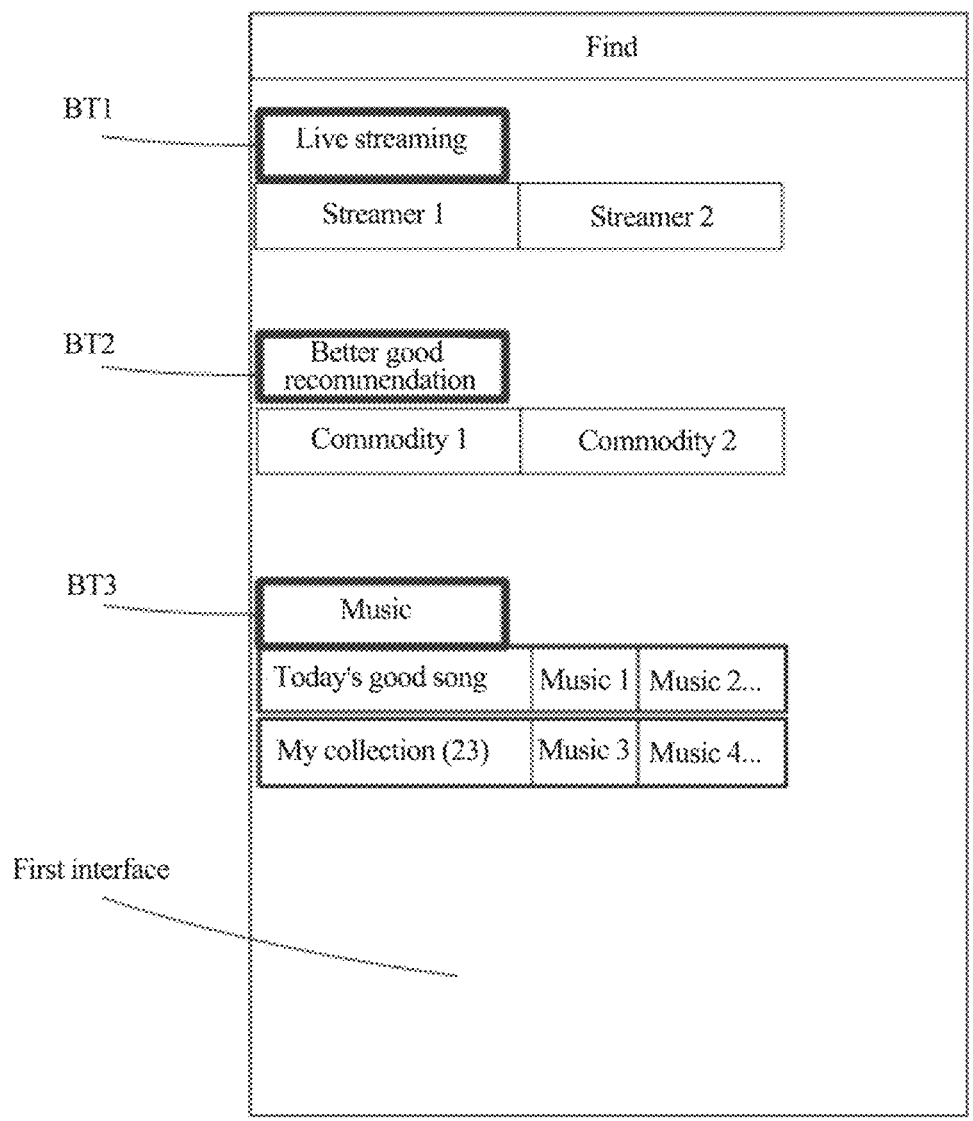

In an implementation, in the first interface, each of the above control further correspondingly displays one or more recommendation objects and/or collection objects in a service corresponding to the control. For example, since the recommendation object and the collection object are included in the first interface, thus the first interface in FIG. 3 completely covers the first application interface. In the first interface shown in FIG. 1, for the above BT1, a recommendation object that can be displayed can be streamer information of a streamer 1 and a streamer 2 being live streaming, and the streamer information can include a streamer image, identification, etc.; for the above BT2, the displayed recommendation object is commodity information of commodity 1 and commodity 2, the commodity 1 and commodity 2 can be newly-online commodities or commodities determined according to a recommendation strategy, and the commodity information can include a commodity image, a commodity name, etc.; for the above BT3, i.e. the second control, it can not only display recommendation objects: music 1 and music 2, but can also display collection objects: music 3 and music 4, music 1 and music 2 can be newly-online music and music determined according to a recommendation strategy. Displaying music is namely displaying music information, where music information can include singer information, a music cover, a music name, an album name, etc. When the number of collected music is 0, only displaying a "my collection" title, without displaying the number of collected songs and the collected music information. When an operation instruction for a displaying region of the collected music information by a user is received, entering into a paging that is used for displaying the collected music information by the user in the second interface.

It can be appreciated that the above recommendation objects can be acquired in real-time each time the first interface is entered, or can be updated according to a certain time period.

In the above first interface, each recommendation object or each object collected by the user can further correspond to a sub-control. When the user clicks on the sub-control, a recommendation object or collection object corresponding to the sub-control clicked by the user can be displayed.

In an implementation, when the terminal device receives the above second operation instruction, a second interface is skipped to, where the second interface can include one or more pagings. When the second interface includes one paging, the paging in the second interface is directly skipped to. When the second interface includes a plurality of pagings, music in different pagings are different, i.e., music is obtained according to different strategies, and one of target pagings in the second interface can be skipped to, where a corresponding music player interface is displayed in the target paging and the music player interface includes information of music being played in the target paging. For example, FIG. 4 exemplarily illustrates a schematic diagram of a second interface, referring to FIG. 4, the second interface includes three pagings: TAB1, TAB2, and TAB3, where TAB1 is used for displaying personalized recommended music, TAB2 is used for displaying music collected by the user, TAB3 is used for displaying non-personalized recommended music information, and TAB2 is currently displayed in the second interface. When a second operation instruction is received, a target paging TAB1 of the second interface is skipped to and music is played, where the music includes a first music that is personalized recommended. Certainly, the user can switch among the three pagings, after each switching to one paging, the first music in the paging can be played, or music being played in the paging before switching can also be continued being played. The above target pagings can be one of the following: a default paging, a paging corresponding to the second operation instruction, and a paging to which music corresponding to the second operation instruction belongs.

Where the default paging can be any preset paging, e.g., TAB1.

The paging corresponding to the second operation instruction can be a paging corresponding to a region clicked by the user. For example, a control for skipping to each paging is displayed in the first interface, and a region displaying the control corresponds to the paging. When a user clicks on one of the controls, a paging corresponding to the control is displayed in the second interface.

The paging to which the music corresponding to the second operation instruction belongs can be a paging to which music displayed by a region clicked by the user belongs. For example, the recommended music and collected music are displayed in the first interface, and when a user clicks on the region where the collected music is located, a paging to which the collected music belongs is displayed, i.e. the second paging used for displaying collected music.

After displaying the target paging of the second interface, the music player interface can be displayed in the target paging, and the playing can be started from any music of the target paging, i.e., any music can be treated as the first played music. Certainly, if the second operation instruction is performed correspondingly to one piece of music, then the playing can also be started from the music corresponding to the second operation instruction, i.e., the music corresponding to the second operation instruction is the first played music.

Where the personalized recommended music information can be music information matched with a user preference, the non-personalized recommended music information can be music information determined according to a music evaluation index, and the non-personalized recommended music information can be music information with higher access amount.

Figure 4:
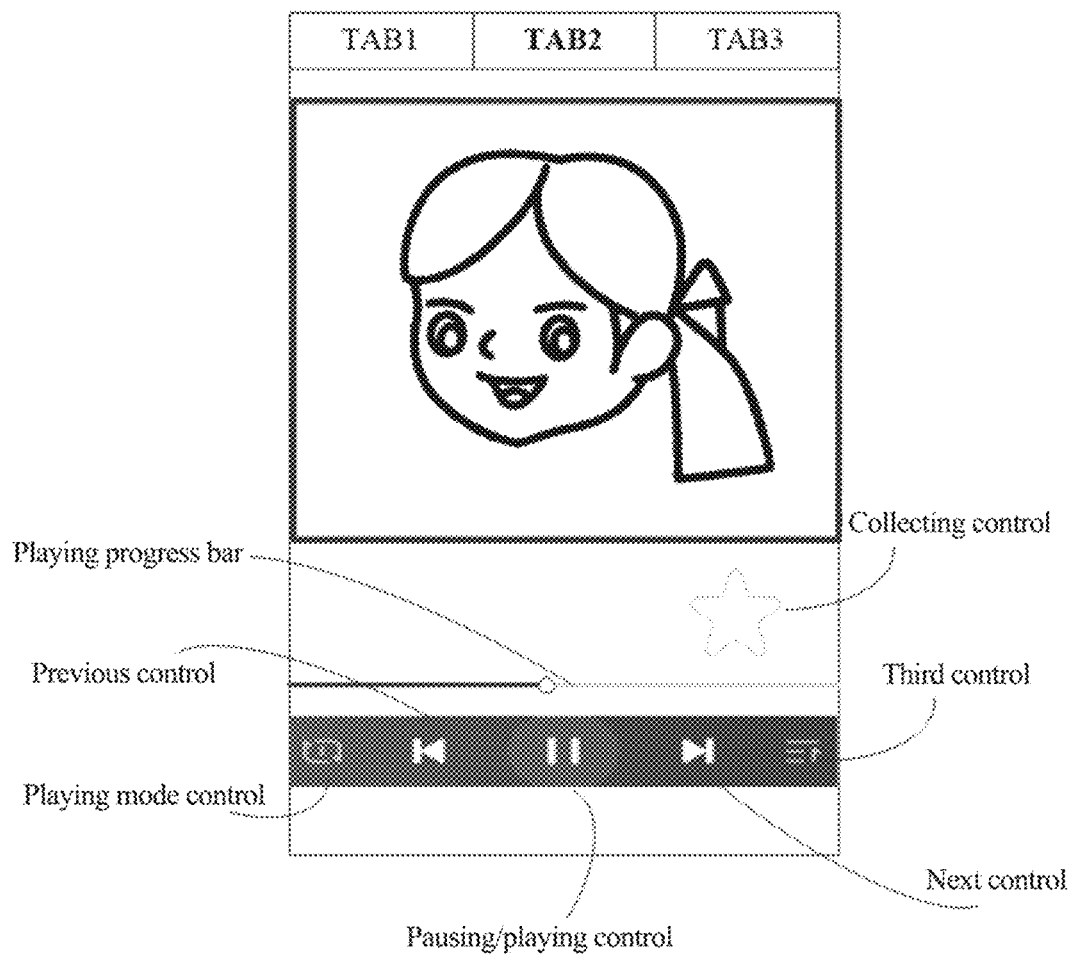
FIG. 4 exemplarily illustrates a schematic diagram of a second interface provided by an embodiment of the present disclosure.

For the personalized recommended music information, music information can include but is not limited to, a music cover, a music name, music creator information. As shown in FIG. 4, in the corresponding paging (hereinafter referred to as first paging), a playing progress bar is further displayed, the total duration of the playing progress bar is total duration of music being played, and the user can operate on the playing progress bar to adjust the playing progress.

In an implementation, in the music player interface of the above first paging, the personalized recommended music information being playing is displayed by default. As shown in FIG. 4, a third control is further displayed in the first paging, and when the user clicks on the third control, all personalized recommended music information is displayed in the first paging.

In an implementation, in the music player interface of the first paging, a managing control of music information can further be displayed. The user operates on the managing control to delete one or more music information, or adjust a playing order of the music information.

In an implementation, referring to FIG. 4, the music player interface further includes a pausing/playing control used for pausing or playing music.

In an implementation, in the music player interface of the first paging, a playing controlling control of music information can further be displayed. The user can operate on the playing controlling control to switch the playing between the personalized recommended music information, for example, as shown in FIG. 4, the user can click on a previous control to switch from the current music to a previous music, and the user can click on a next control to switch from the current music to a next music. Certainly, the user can further perform a sliding operation on a music player interface of any one of pagings of the second interface, and when the terminal device receives the sliding operation, it switches the playing of music of the paging in the music player interface according to the sliding operation. For example, the user can switch from a current music to a previous music by a sliding operation toward a first direction, switch from the current music to a next music by a sliding operation toward a second direction, where the first direction and the second direction are opposite, for example, the first direction is downward sliding and the second direction is upward sliding.

In an implementation, in the music player interface of the above first paging, as shown in FIG. 4, a playing mode control of music information can further be displayed. The user can operate on the playing mode control to switch a playing mode, where the playing mode can be a sequential playing, a single tune circulation, a random playing, etc. as shown in FIG. 4, the current playing mode is a single tune circulation.

In an implementation, in the music player interface of the first paging, as shown in FIG. 4, a collecting control of music information can further be displayed. The user can operate on the collecting control to collect music information.

Certainly, when the user switches the first application to be run in the back-end, or after turning off a screen of the terminal device, music in the above first paging can be continued being played.

For the above music information collected by the user, the music information includes a music cover, a music name, a music creator name, music duration, and music information collected by the user is displayed in a corresponding paging (hereinafter referred to as second paging).

After switching from a paging corresponding to the non-personalized recommended music information (hereinafter referred to as third paging) to the second paging, the music being played in the third paging continues being played, and the music being played in the third paging is stopped to play before the second paging plays music.

In an implementation, a control used for playing all of the music information is further displayed in the above second paging. After the user operates on the control, the music can be played sequentially according to a sequence.

In an implementation, each piece of music information in the above second paging corresponds to a sub-control. After the user operates on the sub-control, music corresponding to the sub-control can be played. The music corresponding to the sub-control can be played in a full screen mode by default. The user can also switch the full screen mode to a simplified mode and switch the simplified mode back to the full screen mode.

In the full screen mode, the playing progress bar, the managing control of the music information, the playing controlling control of the music information, the playing mode control, and a cancelling collecting control are displayed.

In an implementation, in the full screen mode, a third control is further displayed, and when the user clicks on the third control, all personalized recommended music information is displayed in the second paging.

In an implementation, in the full screen mode, a managing control of music information can further be displayed. The user operates on the managing control to delete one or more music information, or adjust a playing order of the music information.

In an implementation, in the full screen mode, a playing controlling control of music information can further be displayed. The user can operate on the playing controlling control to switch the playing between personalized recommended music information, for example, the user can click on a "previous" control to switch from current music to a previous music, and the user can click on a "next" control to switch from the current music to a next music. Certainly, the user can further switch from the current music to the previous music by a sliding operation toward a first direction, and switch from the current music to the next music by a sliding operation in a second direction, where the first direction and the second direction are opposite, for example, the first direction is downward sliding and the second direction is upward sliding.

In an implementation, in the full screen mode, a playing mode control of the music information can further be displayed. The user can operate on the playing mode control to switch the playing mode, where the playing mode can be a sequential playing, a single tune circulation, a random playing, etc.

In an implementation, in the full screen mode, a collecting control of music information can further be displayed. The user can operate on the collecting control to collect music information.

Certainly, when the user switches the first application to be run in the back-end, or turns off the screen of the terminal device, the music in the above second paging is continued being played.

In the simplified mode, a music name being played, a music cover, a music creator, a control for pausing the playing, a control for restarting the playing, and a control for canceling to collect the music are displayed.

In an implementation, when the number of music information collected by the user is less than or equal to a preset number threshold (which can be referred to as a first preset number threshold), the music to be collected can be recommended to the user to enable the user to collect music information, so that the number of collected music information reaches a first preset number threshold. The above recommended music to be collected can be music that is not played in the personalized recommended music information, that is, music that is not played in the first paging, and certainly, the recommended music to be collected can further be music that is not played in the third paging. The recommended music to be collected can be updated according to a preset period.

In an implementation, the second paging can be divided into two regions, one region of which is used for displaying the music information collected by the user, and the other region of which is used for displaying the recommended music to be collected.

In an implementation, in the above second paging, a control for deleting the recommended music to be collected can further be displayed. The user can delete the one or more recommended music to be collected through the control.

In an implementation, when a stopping displaying operation on the recommended music to be collected by the user is received, the prompting control can be displayed if the number of music information collected by the user is 0, where the prompting control is used for prompting the user to switch to the first paging. The first paging is displayed when an operation instruction for the prompting control by the user is received.

The above prompting control can also be referred to as a skipping control, the above stopping displaying operation on the recommended music to be collected can be a closing instruction for the displaying region of the recommended music to be collected, so that the skipping control is displayed in the music player interface when a closing instruction for the displaying region of the recommended music to be collected by the user is received and if the number of collected music in the music player interface of the second paging is less than or equal to a second preset number threshold, where the skipping control is used for skipping to the first paging or the third paging, and the second preset number threshold is less than the first preset number threshold. The second preset number can be 0 or a less value.

In an implementation, when the number of music information collected by the user is greater than a preset number threshold, the recommended music to be collected can not be displayed to the user when the second paging is displayed next time.

For the above non-personalized recommended music information, the music information includes a music cover, a music name, a music creator name, music duration, a music evaluation index.

After the second paging is switched to the third paging, the music being played in the second paging is continued being played, and the music being played in the second paging is stopped to play before the third paging plays the non-personalized recommended music.

In an implementation, a update time of the non-personalized recommended music acquired this time and change information between the non-personalized recommended music acquired this time and the non-personalized recommended music acquired previous time can further be displayed in the third paging.

In an implementation, a control for playing all of the music information is further displayed in the above third paging. After the user operates on the control, the music can be played sequentially in sequence.

In an implementation, each piece of music information in the above third paging corresponds to a sub-control. The user can play music corresponding to the sub-control after operating on the sub-control. The music corresponding to the sub-control can be played in full screen mode by default. The user can also switch the full screen mode to the simplified mode and switch the simplified mode back to the full screen mode.

In the full screen mode, a playing progress bar, a managing control of the music information, a playing controlling control of the music information, a playing mode control, and a collecting control are displayed.

In an implementation, in the full screen mode, a third control is further displayed, and when the user clicks on the third control, all personalized recommended music information is displayed in the third paging.

In an implementation, in the full screen mode, a managing control of music information can further be displayed. The user operates on the managing control to delete one or more music information, or adjust the playing order of the music information.

In an implementation, in the full screen mode, a playing controlling control of music information can further be displayed. The user can operate on the playing controlling control to switch the playing between personalized recommended music information, for example, the user can click on the "previous" control to switch from the current music to the previous music, and the user can click on the "next" control to switch from the current music to the next music. Certainly, the user can also switch from the current music to the previous music by a sliding operation toward the first direction, and switch from the current music to the next music by a sliding operation toward the second direction, where the first direction and the second direction are opposite, for example, the first direction is downward sliding and the second direction is upward sliding.

In an implementation, in the full screen mode, a playing mode control of music information can further be displayed. The user can operate on the playing mode control to switch the playing mode, where the playing mode can be a sequential playing, a single tune circulation, a random playing, etc.

In an implementation, in the full screen mode, a collecting control of music information can further be displayed. The user can operate on the collecting control to collect music information.

Certainly, when the user switches the first application to be run in the back-end, or after turning off the screen of the terminal device, music in the above third paging can be continued being played.

In the simplified mode, a music name being played, a music cover, a music creator, a control for pausing the playing, a control for restarting the playing, and a control for collecting the music are displayed.

It should be noted that music of the first paging is in a first playing queue, and music in the second paging and music in the third paging are both in a second playing queue.

As can be seen from the above explanation, a plurality of pagings of the second interface can be switched therebetween, and the switching process can include: receiving a paging switching instruction; displaying a paging after switching in response to the paging switching instruction; and if a first music is being played in the music player interface of the paging before switching, the first music is continued being played after switching the paging.

It can be appreciated that when the first music is continued being played after switching paging, the first music is no longer displayed, but rather a music player interface in the paging after switching is displayed, where the music playing interface may not play music. The user can select one of music to play in the paging after switching.

The process in which the user plays music in the paging after switching can include: receiving a music playing instruction in a music player interface of the paging after switching, where the music playing instruction is used for requesting to play a second music; stopping playing the first music and playing the second music in a music player of the paging after switching in response to the music playing instruction.

It can be seen that after the user selects the second music to play in the paging after switching, the first music played in the music player of the paging before switching is stopped, so that worse playing effect, which is resulted from that two music players play music at the same time, can be avoided.

In an implementation, music related to in embodiments of the present disclosure is a whole song of music or a segment of music, and when the music is a segment of music, embodiments of the present disclosure can further provide a function of whole song playing, main steps of which includes: receiving a whole song playing instruction for a target segment of music in a music player interface being displayed in the second interface; playing complete music to which the target segment of music belongs in response to the whole song playing instruction.

Specifically, a whole song playing control can be displayed in the music player interface being displayed in the second interface, and after the user clicks on the whole song playing control, complete music is played, where the complete music is usually obtained in a compliant manner.

In an implementation, at least one picture can further be displayed in a music player interface being displayed in the second interface, where the picture is drawn according to the music being played.

Where the picture is associated with music content being played, furthermore, at each time in a process of playing the music, the picture displayed at that time is associated with music content played at that time. For example, the mood expressed by the music being played is sadness, a picture for expressing sadness can be drawn.

Figure 5:
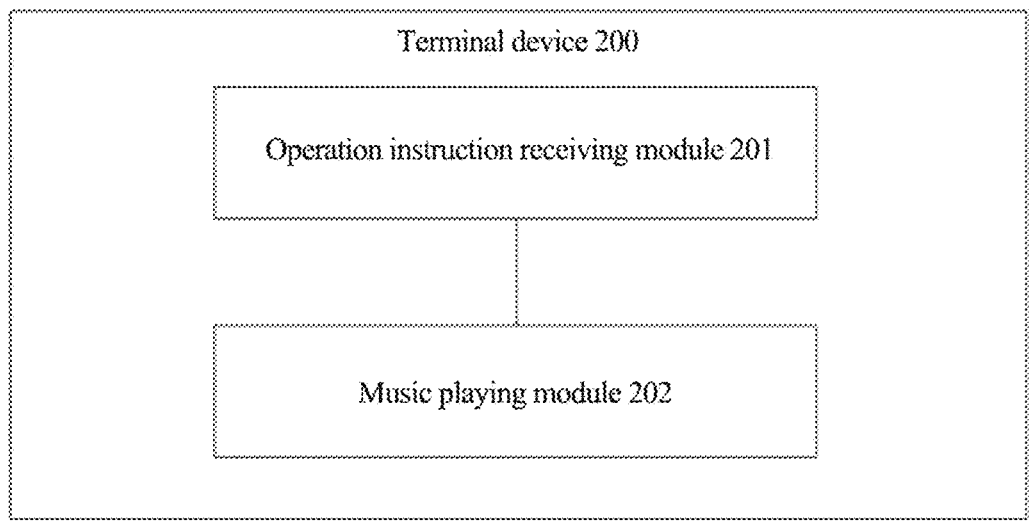
FIG. 5 to FIG. 7 exemplarily gives three structural block diagrams of a terminal device provided by an embodiment of the present disclosure.

In particular, when the music being played is audio music, the picture can be displayed. When the music being played is video music, the picture or the video corresponding to the video music can be displayed. Corresponding to the music playing method shown in FIG. 1, FIG. 5 exemplarily gives a structural block diagram of a terminal device provided by an embodiment of the present disclosure. For ease of illustration, only portions related to embodiments of the present disclosure are shown. Referring to FIG. 5, the above terminal device 200 includes: an operation instruction receiving module 201 and a music playing module 202.

Where the operation instruction receiving module 201 is configured to receive a first operation instruction in a first application with a function of video playing.

The music playing module 202 is configured to invoke a music player to play music in the first application in response to the first operation instruction, where the music is audio music or video music.

In an implementation, the music playing module 202 is further configured to:

display a first interface, where the first interface includes at least one control, where each of the control corresponds to a type of service;

receive a second operation instruction for a second control in the at least one control by a user, where the second control corresponds to a music service; and invoke the music player to play the music in the first application in response to the second operation instruction.

In an implementation, the first interface further includes at least one object of the following: a recommendation object in a service corresponding to the control, and a collection object in a service corresponding to the control. For the second control, the service is a music service, and the object is music.

In an implementation, the terminal device further includes:

a music player interface displaying module, configured to display a music player interface corresponding to the target paging in one target paging of the second interface in response to the second operation instruction, where the music player interface includes information of music being played in the target paging; and when the second interface includes at least two pagings, music in different pagings are different.

In an implementation, the target paging is one of the following: a default paging, a paging corresponding to the second operation instruction, and a paging to which music corresponding to the second operation instruction belongs.

In an implementation, music being firstly played is one of the following: any music in the target paging, music corresponding to the second operation instruction.

In an implementation, pagings of the second interface includes: a first paging used for displaying personalized recommended music, a second paging used for displaying collected music, and a third paging used for displaying non-personalized recommended music.

In an implementation, the terminal device further includes:

a sliding operation receiving module, configured to receive a sliding operation in a music player interface of any one of the pagings; and a switching playing module, configured to switch the playing of music of the pagings in the music player interface according to the sliding operation.

In an implementation, the terminal device further includes:

a paging switching instruction receiving module, configured to receive a paging switching instruction;

a paging after switching displaying module, configured to display a paging after switching in response to the paging switching instruction; and a first music playing module, configured to continue playing a first music after switching paging if the first music is being played in the music player interface of a paging before switching.

In an implementation, the terminal device further includes:

a requesting playing module, configured to receive a music playing instruction in a music player interface of the paging after switching, where the music playing instruction is used for requesting to play a second music; and a second music playing module, configured to stop playing the first music and play the second music in a music player of the paging after switching in response to the music playing instruction.

In an implementation, the terminal device further includes:

a mode switching operation receiving module, configured to receive a mode switching operation on a music player interface being displayed in the second interface; and a mode switching module, configured to switch the music player interface between a full screen mode and a simplified mode for displaying in response to the mode switching operation.

In an implementation, if a number of collected music in the second paging is less than or equal to a first preset number threshold, a music player interface of the second paging further includes recommended music to be collected, where the recommended music to be collected includes at least one of following: music that is not played in the first paging, and music that is not played in the third paging.

In an implementation, the terminal device further includes:

a closing instruction receiving module, configured to receive a closing instruction for a displaying region of the recommended music to be collected; and a skipping control displaying module, configured to display a skipping control in a music player interface if the number of collected music in the music player interface of the second paging is less than or equal to a second preset number threshold in response to the closing instruction, where the skipping control is used for skipping to the first paging or the third paging, and the second preset number threshold is less than the first preset number threshold.

In an implementation, the music is a whole song of music or a segment of music, and when the music is a segment of music, the terminal device further includes:

a whole song playing requesting module, configured to receive a whole song playing instruction for a target segment of music in a music player interface being displayed in the second interface; and a complete music playing module, configured to play complete music to which the target segment of music belongs in response to the whole song playing instruction.

In an implementation, the terminal device further includes:

a picture displaying module, configured to display at least one picture in a music player interface being displayed in the second interface, where the picture is drawn according to music being played.

In an implementation, the first application implements the function of video playing by a first player, where the first player and the music player have different interfaces.

In an implementation, the music is associated with music included in a video being played in the first player.

The terminal device provided by the present embodiment can be used for performing the technical solution of the above method embodiments, of which the implementation principle and technical effect are similar, and reference can be made to detailed description in the above method embodiments, and here will not be repeated in the present embodiment.

Figure 6:
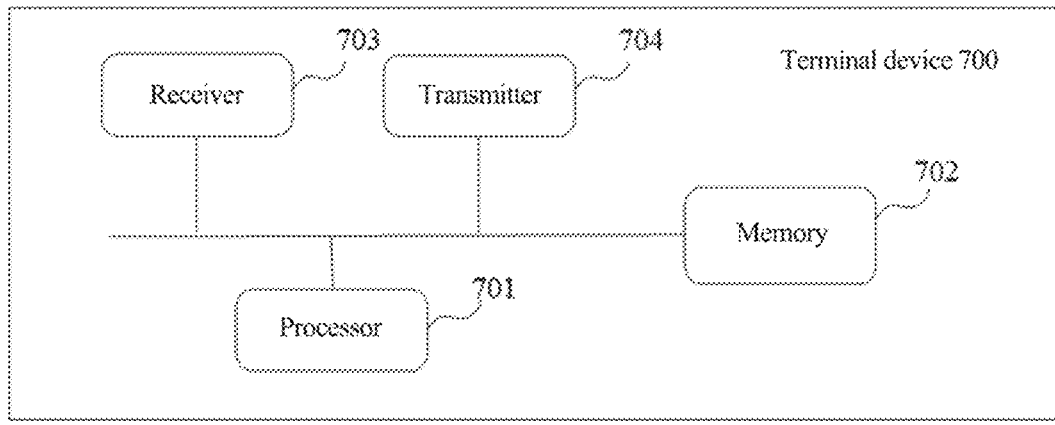

FIG. 6 exemplarily gives a structural block diagram of a terminal device 700 provided by an embodiment of the present disclosure. The terminal device 700 includes a memory 702 and at least one processor 701;

where the memory 702 stores computer executable instructions;

the at least one processor 701 executes computer executable instructions stored by the memory 702, causing the terminal device to implement the above method of FIG. 1; and in addition, the terminal device can further include a receiver 703 and a transmitter 704, where the receiver 703 is used for receiving information transmitted from a remaining apparatus or device, and forwarding to the processor 701, and the transmitter 704 is used for transmitting information to the remaining apparatus or device.

Figure 7:
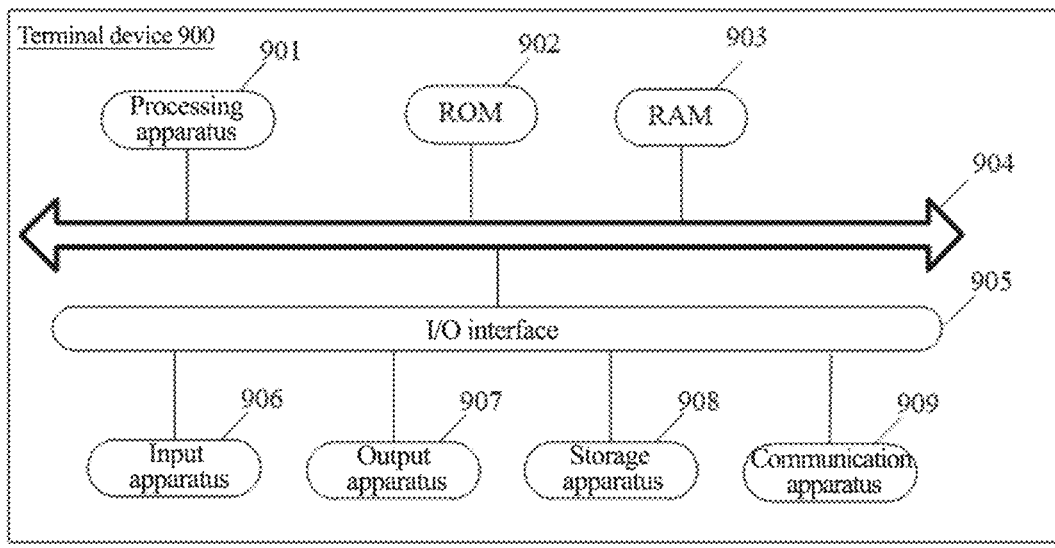

Further, referring to FIG. 7, it exemplarily gives a hardware structural schematic diagram of a terminal device 900 provided by an embodiment of the present disclosure, where the terminal device can include, but is not limited to, a mobile terminal such as a mobile phone, a notebook computer, a digital broadcast receiver, a personal digital assistant (Personal Digital Assistant, abbreviated as PDA), a tablet computer (Portable Android Device, abbreviated as PAD), a portable media player (abbreviated as PMP), an in-vehicle terminal (e.g. an in-vehicle navigation terminal), and so on, as well as a fixed terminal such as a digital TV, a desktop computer, and so on. The terminal device shown in FIG. 7 is merely one example, which should not bring any limitation to the function and scope of use of the embodiments of the present disclosure.

As shown in FIG. 7, the terminal device 900 can include a processing apparatus (e.g. a central processor, a graphics processor, etc.) 901, which can perform various appropriate actions and processes according to a program stored in a read only memory (abbreviated as ROM) 902 or a program loaded into a random access memory (abbreviated as RAM) 903 from a storage apparatus 908. In RAM 903, various programs and data required by the terminal device 900 for operating are further stored. The processing apparatus 901, the ROM 902, and the RAM 903 are connected to each other through a bus 904. An input/output (Input/Output, I/O) interface 905 is also connected to the bus 904.

In general, the following apparatus can be connected to the I/O interface 905: an input apparatus 906 including, for example, a touch screen, a touchpad, a keyboard, a mouse, a camera, a microphone, an accelerometer, a gyroscope, etc.; an output apparatus 907 including, for example, a liquid crystal display (abbreviated as LCD), a speaker, a vibrator, etc.; a storage apparatus 908 including, for example, a magnetic tape, a hard disk, etc.; and a communication apparatus 909. The communication apparatus 909 can allow the terminal device 900 to perform wireless or wired communication with other devices to exchange data. Although FIG. 7 illustrates the terminal device 900 provided with various apparatus, it should be understood that not all illustrated apparatus are required to be implemented or provided. More or fewer apparatuses can optionally be implemented or provided.

In particular, according to embodiments of the present disclosure, processes described above with reference to flowchart can be implemented as computer software programs. For example, embodiments of the present disclosure include a computer program product, which includes a computer program carried on a computer readable medium, where the computer program contains program codes used for performing the method shown in the flowchart. In such embodiments, the computer program can be downloaded and installed from the network through the communication apparatus 909, or installed from the storage apparatus 908, or installed from the ROM 902. When the computer program is executed by the processing apparatus 901, the above functions defined in the method of the embodiments of the present disclosure is performed.

It should be noted that the above computer readable medium of the present disclosure can be a computer readable signal medium or a computer readable storage medium or any combination of the above two. A computer readable storage medium can be, but not limited to, an electronic, magnetic, optical, electromagnetic, infrared, or semiconductor system, apparatus, or device, or any combination thereof. More specific examples of a computer readable storage medium can include, but are not limited to: an electrical connection having one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing. In the present disclosure, a computer readable storage medium can be any tangible medium that contains or stores a program, where the program can be used by an instruction execution system, apparatus, or device or be used in a combination thereof. And in the present disclosure, a computer readable signal medium can include a data signal propagated in baseband or as part of a carrier wave, where computer readable program codes are carried. Such a propagated data signal can adopt a variety of forms, including, but not limited to, an electromagnetic signal, an optical signal, or any suitable combination of the foregoing. A computer readable signal medium can further be any computer readable medium besides a computer readable storage medium, where the computer readable signal medium can transmit, propagate, or transport a program used for being used by an instruction execution system, apparatus, or device, or being used in a combination thereof. Program codes contained on a computer readable medium can be transported using any suitable medium, including, but not limited to, wires, optical cables, RF (radio frequency), and so on, or any suitable combination of the foregoing.

The above computer readable medium can be one contained in the above terminal device; or can be present separately without being assembled into the terminal device.

The above computer readable medium carries one or more programs, and when the above one or more programs executed by the terminal device, causing the terminal device to perform the method shown by the above embodiments.

The present disclosure further provides a computer program, where the program causes a computer to implement the method shown by the above embodiments.

Computer program codes for performing operations of the present disclosure can be written in one or more programming languages or a combination thereof, where the above programming languages includes an object-oriented programming language, such as Java, Smalltalk, C++, and further includes conventional procedural programming languages, such as the "C" language or similar programming languages. The program codes can be performed entirely on a user's computer, performed partly on the user's computer, performed as an individual software package, performed partly on the user's computer while partly on a remote computer, or performed entirely on a remote computer or server. In a scenario related to a remote computer, the remote computer can be connected to a user's computer through any kind of network, including a local area network (abbreviated as LAN) or a wide area network (abbreviated as WAN), or, can be connected to an external computer (e.g. connected by Internet utilizing an Internet service provider).

Flowcharts and block diagrams in drawings illustrates an architecture, a function, and an operation which can be implemented by a system, a method, and a computer program product according to various embodiments of the present disclosure. In this regard, each block in a flowchart or block diagram can represent one module, program segment, or part of codes, which contains one or more executable instructions used for implementing a specified logical function. It should also be noted that, in some alternative implementations, a function noted in a block can occur differently from the order noted in the drawings. For example, two blocks represented in succession can, in fact, be substantially performed concurrently, or they can sometimes be performed in a reverse order, which depends on the function involved. It should also be noted that each block of a block diagram and/or flowchart, and a combination of blocks in the block diagram and/or flowchart, can be implemented by using dedicated hardware-based systems that perform the specified functions or operations, or a combination of a dedicated hardware and computer instructions.

A unit described in and related to the embodiments of the present disclosure can be implemented in a software manner, also can be implemented in a hardware manner. Where a name of a unit in a certain case does not constitute a definition of the unit itself, for example, the first obtaining unit can further be described as "unit obtaining at least two international protocol addresses".

The functions described above herein can be performed, at least partially, by one or more hardware logic components. For example, non-restrictively, exemplary types of hardware logic components that can be used include: a field programmable gate array (FPGA), an application specific integrated circuit (ASIC), an application specific standard parts (ASSP), a system on chip (SOC), a complex programmable logic device (CPLD), and so on.

In context of the present disclosure, a machine readable medium can be a tangible medium, which can contain or store a program provided to be used by or be used in connection with an instruction execution system, apparatus, or device. The machine readable medium can be a machine readable signal medium or a machine readable storage medium. The machine readable medium can include, but is not limited to, an electronic, magnetic, optical, electromagnetic, infrared, or semiconductor system, apparatus, or device, or any suitable combination of the foregoing. More specific examples of a machine readable storage medium would include an electrical connection based one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

Embodiments of the present disclosure further provide a computer program, where the computer program is used for implementing the above music playing method.

Embodiments of the present disclosure further provide a computer readable storage medium, where the computer readable storage medium has computer executable instructions stored therein, which when executed by a processor, causing a computing device to implement the above music playing method.

In a first example of a first aspect, a music playing method is provided, including:

receiving a first operation instruction in a first application with a function of video playing; and invoking a music player to play music in the first application in response to the first operation instruction, where the music is audio music or video music.

Based on the first example of the first aspect, in a second example of the first aspect, the invoking a music player to play music in the first application, including:

displaying a first interface, where the first interface includes at least one control, and each of the control corresponds to a type of service;

receiving a second operation instruction for a second control in the at least one control by a user, where the second control corresponds to a music service; and invoking the music player to play the music in the first application in response to the second operation instruction.

Based on the second example of the first aspect, in a third example of the first aspect, the first interface further includes at least one object of the following: a recommendation object in a service corresponding to the control, a collection object in a service corresponding to the control, and for the second control, the service is a music service, and the object is music.

Based on the third example of the first aspect, in a fourth example of the first aspect, the method further includes:

displaying a music player interface corresponding to the target paging in one target paging of the second interface in response to the second operation instruction, where the music player interface includes information of music being played in the target paging; and when the second interface includes at least two pagings, music in different pagings are different.

Based on the fourth example of the first aspect, in a fifth example of the first aspect, the target paging is one of the following: a default paging, a paging corresponding to the second operation instruction, and a paging to which music corresponding to the second operation instruction belongs.

Based on the fifth example of the first aspect, in a sixth example of the first aspect, music being firstly played is one of the following: any music in the target paging, music corresponding to the second operation instruction.

Based on the fourth example of the first aspect, in a seventh example of the first aspect, pagings of the second interface includes: a first paging used for displaying personalized recommended music, a second paging used for displaying collected music, and a third paging used for displaying non-personalized recommended music.

Based on a fourth example of the first aspect, in an eighth example of the first aspect, the method further includes:

receiving a sliding operation in a music player interface of any one of the pagings; and switching the playing of music of the pagings in the music player interface according to the sliding operation.

Based on a seventh example of the first aspect, in a ninth example of the first aspect, the method further includes:

receiving a paging switching instruction;

displaying a paging after switching in response to the paging switching instruction; and continuing playing a first music after switching paging if the first music is being played in the music player interface of a paging before switching.

Based on the ninth example of the first aspect, in an tenth example of the first aspect, the method further includes:

receiving a music playing instruction in a music player interface of the paging after switching, where the music playing instruction is used for requesting to play a second music; and stopping playing the first music and playing the second music in a music player of the paging after switching in response to the music playing instruction.

Based on the tenth example of the first aspect, in an eleventh example of the first aspect, the method further includes:

receiving a mode switching operation on a music player interface being displayed in the second interface; and switching the music player interface between a full screen mode and a simplified mode for displaying in response to the mode switching operation.

Based on the seventh example of the first aspect, in a twelfth example of the first aspect, if a number of collected music in the second paging is less than or equal to a first preset number threshold, a music player interface of the second paging further includes recommended music to be collected, where the recommended music to be collected includes at least one of following: music that is not played in the first paging, and music that is not played in the third paging.

Based on the twelfth example of the first aspect, in a thirteenth example of the first aspect, the method further includes:

receiving a closing instruction for a displaying region of the recommended music to be collected; and displaying a skipping control in the music player interface if the number of collected music in a music player interface of the second paging is less than or equal to a second preset number threshold in response to the closing instruction, where the skipping control is used for skipping to the first paging or the third paging, and the second preset number threshold is less than the first preset number threshold.

Based on the fourth example of the first aspect, in a fourteenth example of the first aspect, the music is a whole song of music or a segment of music, and when the music is a segment of music, the method further includes:

receiving a whole song playing instruction for a target segment of music in a music player interface being displayed in the second interface; and playing complete music to which the target segment of music belongs in response to the whole song playing instruction.

Based on the fourth example of the first aspect, in a fifteenth example of the first aspect, the method further includes:

displaying at least one picture in a music player interface being displayed in the second interface, where the picture is drawn according to music being played.

Based on any one of the first to fifteenth examples of the first aspect, in a sixteenth example of the first aspect, the first application implements the function of video playing by a first player, where the first player and the music player have different interfaces.

Based on the sixteenth example of the first aspect, in a seventeenth example of the first aspect, the music is associated with music included in a video being played in the first player.

In a first example of a second aspect, a terminal device is provided, including:

an operation instruction receiving module, configured to receive a first operation instruction in a first application with a function of video playing; and a music playing module, configured to invoke a music player to play music in the first application in response to the first operation instruction, where the music includes at least one of the following: audio music and video music.

Based on the first example of the second aspect, in a second example of the second aspect, the music playing module is further configured to:

display a first interface, where the first interface includes at least one control, and each of the control corresponds to a type of service;

receive a second operation instruction for a second control in the at least one control by a user, where the second control corresponds to a music service; and invoke the music player to play the music in the first application in response to the second operation instruction.

Based on the second example of the second aspect, in a third example of the second aspect, the first interface further includes at least one object of the following: a recommendation object in a service corresponding to the control, a collection object in a service corresponding to the control, and for the second control, the service is a music service, and the object is music.

Based on the third example of the second aspect, in a fourth example of the second aspect, the terminal device further includes:

a music player interface displaying module, configured to display a music player interface corresponding to the target paging in one target paging of the second interface in response to the second operation instruction, where the music player interface includes information of music being played in the target paging; and when the second interface includes at least two pagings, music in different pagings are different.

Based on the fourth example of the second aspect, in a fifth example of the second aspect, the target paging is one of the following: a default paging, a paging corresponding to the second operation instruction, and a paging to which music corresponding to the second operation instruction belongs.

Based on the fifth example of the second aspect, in a sixth example of the second aspect, music being firstly played is one of the following: any music in the target paging, and music corresponding to the second operation instruction.

Based on the fourth example of the second aspect, in a seventh example of the second aspect, pagings of the second interface includes: a first paging used for displaying personalized recommended music, a second paging used for displaying collected music, and a third paging used for displaying non-personalized recommended music.

Based on the fourth example of the second aspect, in an eighth example of the second aspect, the terminal device further includes:

a sliding operation receiving module, configured to receive a sliding operation in a music player interface of any one of the pagings; and a switching playing module, configured to switch the playing of music of the pagings in the music player interface according to the sliding operation.

Based on the seventh example of the second aspect, in a ninth example of the second aspect, the terminal device further includes:

a paging switching instruction receiving module, configured to receive a paging switching instruction;

a paging after switching displaying module, configured to display a paging after switching in response to the paging switching instruction; and a first music playing module, configured to continue playing a first music after switching paging if the first music is being played in the music player interface of a paging before switching.

Based on the ninth example of the second aspect, in a tenth example of the second aspect, the terminal device further includes:

a requesting playing module, configured to receive a music playing instruction in a music player interface of the paging after switching, where the music playing instruction is used for requesting to play a second music; and a second music playing module, configured to stop playing the first music and play the second music in a music player of the paging after switching in response to the music playing instruction.

Based on the tenth example of the second aspect, in an eleventh example of the second aspect, the terminal device further includes:

a mode switching operation receiving module, configured to receive a mode switching operation on a music player interface being displayed in the second interface; and a mode switching module, configured to switch the music player interface between a full screen mode and a simplified mode for displaying in response to the mode switching operation.

Based on the seventh example of the second aspect, in a twelfth example of the second aspect, if a number of collected music in the second paging is less than or equal to a first preset number threshold, a music player interface of the second paging further includes recommended music to be collected, where the recommended music to be collected includes at least one of following: music that is not played in the first paging, and music that is not played in the third paging.

Based on the twelfth example of the second aspect, in a thirteenth example of the second aspect, the terminal device further includes:

a closing instruction receiving module, configured to receive a closing instruction for a displaying region of the recommended music to be collected; and a skipping control displaying module, configured to display a skipping control in a music player interface if a number of collected music in the music player interface of the second paging is less than or equal to a second preset number threshold in response to the closing instruction, where the skipping control is used for skipping to the first paging or the third paging, and the second preset number threshold is less than the first preset number threshold.

Based on the fourth example of the second aspect, in a fourteenth example of the second aspect, the music is a whole song of music or a segment of music, and when the music is a segment of music, the terminal device further includes:

a whole song playing requesting module, configured to receive a whole song playing instruction for a target segment of music in a music player interface being displayed in the second interface; and a complete music playing module, configured to play complete music to which the target segment of music belongs in response to the whole song playing instruction.

Based on the fourth example of the second aspect, in a fifteenth example of the second aspect, the terminal device further includes:

a picture displaying module, configured to display at least one picture in a music player interface being displayed in the second interface, where the picture is drawn according to music being played.

Based on any one of the first to fifteenth examples of the second aspect, in a sixteenth example of the second aspect, the first application implements the function of video playing by the first player, where the first player and the music player have different interfaces.

Based on the sixteenth example of the second aspect, in a seventeenth example of the second aspect, the music is associated with music included in a video being played in the first player.

The above description is merely a preferred embodiment of the present disclosure and an illustration for employing the technical principles. It should be understood by those skilled in the art that the disclosed scope related by the present disclosure is not limited to the technical solution formed by particular combination of the above technical features, and should also cover other technical solutions formed by any combination of the above technical features or the equivalent features thereof without departing from the above disclosed concepts. For example, the technical solution that is formed by replacing the above features and technical features having similar function and disclosed in the present disclosure with each other (which is not limited).

In addition, although various operations are depicted adopting a particular order, this should not be understood as requiring that such operations are performed in the shown particular order or in the sequential order. In certain circumstances, multitasking and parallel processing can be advantageous. Likewise, although several specific implementation details are included in the above discussion, these should not be interpreted as limitations on the scope of the present disclosure. Certain features that are described in the context of separate embodiments can further be implemented in combination in a single embodiment. Conversely, various features that are described in the context of a single embodiment can also be implemented in various embodiments separately or by the way of any suitable sub-combination.

Although the present subject matter has been described in language specific to structural features and/or methodological acts, it should be understood that the subject matter defined in the appended claims is not necessarily limited to specific features or acts described above. On the contrary, the specific features and acts described above are merely exemplary forms of implementing the claims.

The invention claimed is:

1. A music playing method, comprising:
 receiving a first operation instruction in a first application with a function of video playing; and
 invoking a music player to play music in the first application in response to the first operation instruction, wherein the music is audio music or video music;
 wherein the invoking a music player to play music in the first application comprises:

displaying a first interface, wherein the first interface comprises at least one control, wherein each of the control corresponds to a type of service;

receiving a second operation instruction for a second control in the at least one control by a user, wherein the second control corresponds to a music service; and invoking the music player to play the music in the first application in response to the second operation instruction;

wherein the method further comprises:

displaying a music player interface corresponding to a target paging in one target paging of a second interface in response to the second operation instruction, wherein the music player interface comprises information of music being played in the target paging.

2. The method according to claim 1, wherein the first interface further comprises at least one object of the following: a recommendation object in a service corresponding to the control, a collection object in a service corresponding to the control, and for the second control, the service is a music service, and the object is music.

3. The method according to claim 2, wherein the second interface comprises at least one paging, and when the second interface comprises at least two pagings, music in different pagings are different.

4. The method according to claim 3, wherein the target paging is one of the following: a default paging, a paging corresponding to the second operation instruction, and a paging to which music corresponding to the second operation instruction belongs.

5. The method according to claim 4, wherein music being firstly played is one of the following: any music in the target paging, and music corresponding to the second operation instruction.

6. The method according to claim 3, wherein a paging of the second interface comprises: a first paging used for displaying personalized recommended music, a second paging used for displaying collected music, and a third paging used for displaying non-personalized recommended music.

7. The method according to claim 3, further comprising:
receiving a sliding operation in a music player interface of any one of the pagings; and
switching the playing of music of the pagings in the music player interface according to the sliding operation.

8. The method according to claim 6, further comprising:
receiving a paging switching instruction;
displaying a paging after switching in response to the paging switching instruction; and
continuing playing a first music after switching paging if the first music is being played in the music player interface of a paging before switching.

9. The method according to claim 8, further comprising:
receiving a music playing instruction in a music player interface of the paging after switching, wherein the music playing instruction is used for requesting to play a second music; and
stopping playing the first music and playing the second music in a music player of the paging after switching in response to the music playing instruction.

10. The method according to claim 9, further comprising:
receiving a mode switching operation of a music player interface being displayed in the second interface; and
switching the music player interface between a full screen mode and a simplified mode for displaying in response to the mode switching operation.

11. The method according to claim 6, wherein if a number of collected music in the second paging is less than or equal to a first preset number threshold, a music player interface of the second paging further comprises recommended music to be collected, wherein the recommended music to be collected comprises at least one of following: music that is not played in the first paging, and music that is not played in the third paging.

12. The method according to claim 10, further comprising:
receiving a closing instruction for a displaying region of the recommended music to be collected; and
displaying a skipping control in the music player interface if the number of collected music in a music player interface of the second paging is less than or equal to a second preset number threshold in response to the closing instruction, wherein the skipping control is used for skipping to the first paging or the third paging, and the second preset number threshold is less than the first preset number threshold.

13. The method according to claim 3, wherein the music is a whole song of music or a segment of music, and when the music is a segment of music, the method further comprises:
receiving a whole song playing instruction for a target segment of music in a music player interface being displayed in the second interface; and
playing complete music to which the target segment of music belongs in response to the whole song playing instruction.

14. The method according to claim 3, further comprising:
displaying at least one picture in a music player interface being displayed in the second interface, wherein the picture is drawn according to music being played.

15. The method according to claim 1, wherein the first application implements the function of video playing by a first player, wherein the first player and the music player are provided with different interfaces.

16. The method according to claim 15, wherein the music is associated with music comprised in a video being played in the first player.

17. A terminal device, comprising: at least one processor and a memory;
wherein the memory stores computer executable instructions; and
the at least one processor executes computer executable instructions stored by the memory, causing the terminal device to:
receive a first operation instruction in a first application with a function of video playing; and
invoke a music player to play music in the first application in response to the first operation instruction, wherein the music is audio music or video music;
wherein the terminal device is further caused to:
display a first interface, wherein the first interface comprises at least one control, wherein each of the control corresponds to a type of service;
receive a second operation instruction for a second control in the at least one control by a user, wherein the second control corresponds to a music service; and
invoke the music player to play the music in the first application in response to the second operation instruction;
display a music player interface corresponding to a target paging in one target paging of a second interface in response to the second operation instruction, wherein the music player interface comprises information of music being played in the target paging.

18. A computer readable storage medium, wherein the computer readable storage medium has computer executable instructions stored therein, and when the computer executable instructions are executed by a processor, causing a computing device to:

receive a first operation instruction in a first application with a function of video playing; and invoke a music player to play music in the first application in response to the first operation instruction, wherein the music is audio music or video music;

wherein the computer executable instructions further causes a computing device to:

display a first interface, wherein the first interface comprises at least one control, wherein each of the control corresponds to a type of service;

receive a second operation instruction for a second control in the at least one control by a user, wherein the second control corresponds to a music service; and invoke the music player to play the music in the first application in response to the second operation instruction;

display a music player interface corresponding to a target paging in one target paging of a second interface in response to the second operation instruction, wherein the music player interface comprises information of music being played in the target paging.

* * * * *